Dec. 15, 1959  O. L. TAYLOR  2,917,610
ELECTRIC WIRING DEVICE
Filed Dec. 27, 1956  2 Sheets-Sheet 1

WITNESSES
Edwin E. Bassler
Wm. B. Sellers.

INVENTOR
Owen L. Taylor
BY Arthur T. Stratton
ATTORNEY

Dec. 15, 1959

O. L. TAYLOR 2,917,610

ELECTRIC WIRING DEVICE

Filed Dec. 27, 1956

United States Patent Office 2,917,610
Patented Dec. 15, 1959

2,917,610

ELECTRIC WIRING DEVICE

Owen L. Taylor, Easton, Conn., assignor to Westinghouse Electric Corporation, East Pittsburgh, Pa., a corporation of Pennsylvania Application December 27, 1956, Serial No. 630,843

4 Claims. (Cl. 200—152)

This invention relates generally to electric wiring devices, and more particularly to wiring devices such as switches adapted to be mounted in enclosures for wiring from either the front or the back of the switch.

Where electric switches are to be mounted in enclosures, such as outlet boxes, it is desirable that where screw-type terminals are provided for the switch that they be accessible from the front of the switch, and that provision be also made for making the wire connections at either the front or back of the switch. Prior attempts to construct switches to accommodate the several conditions mentioned above have been made, but they have resulted in relatively complex constructions which have been relatively expensive and difficult to manufacture and to use in the field.

Accordingly, one object of this invention is to provide a simplified wiring device design having a novel contact and terminal construction which will provide for access to the terminals from the front of the device, and permit wiring at either the front or back of the device in a simplified manner.

Another object of this invention is to provide a novel form of wiring device having terminals provided at opposite sides associated with the contacts of the device and arranged at an angle to the front of the device, with provision for either front or rear wiring.

Still another object of this invention is to provide a novel wiring device construction having a one-piece contact terminal construction which cooperates with a casing for the device in a novel manner.

These and other objects of this invention will become more apparent upon consideration of the following detailed description of preferred embodiments thereof, when taken in connection with the attached drawings, in which.

Figure 2:
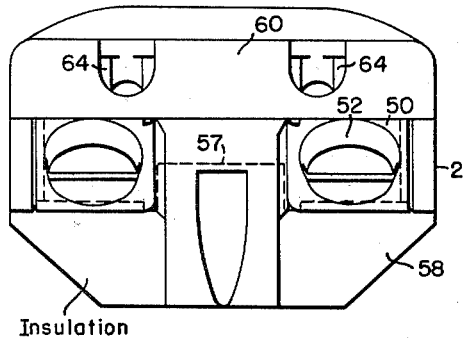
Fig. 2 is an end view of the switch shown in Fig. 1.
Figure 1:
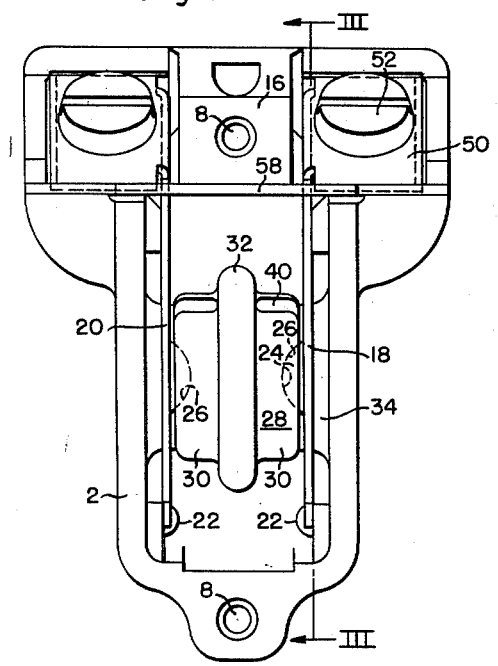
Fig. 1 is a top plan view of a switch constructed in accordance with this invention, with the top cover and operating handle removed.
Figure 3:
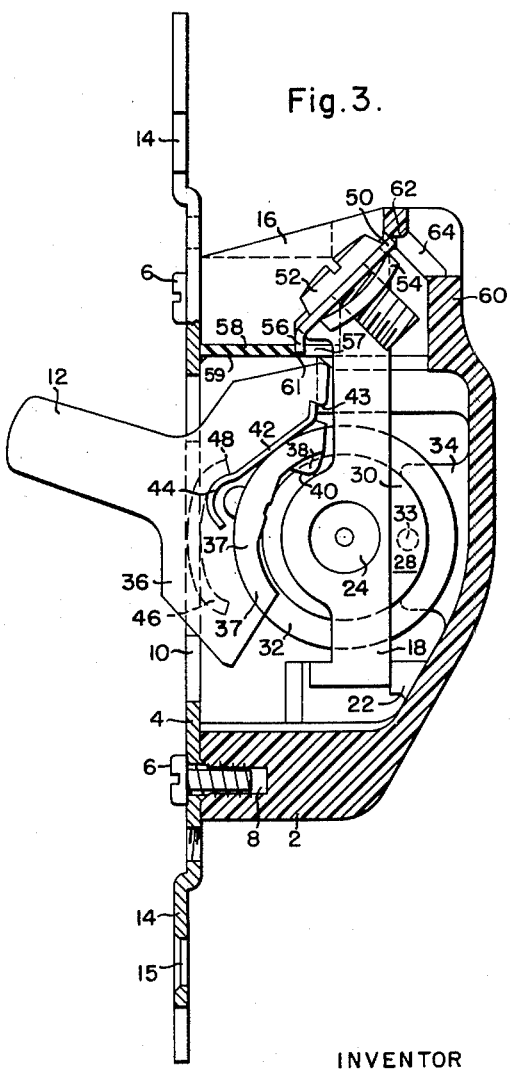
Fig. 3 is a longitudinal sectional view of the switch shown in Figs. 1 and 2 with the top cover assembled therewith, and taken substantially on the line III—III of Fig. 1.

In the illustrative form of the invention shown in Figs. 1 to 3, a switch is provided mounted in an elongated casing 2 of insulating material, preferably a molded insulating material, with the casing having an open front. The open front of the casing 2 is adapted to be covered by a mounting strap 4, which may be of metal, and which is secured to the casing, for example, by screws 6 which pass through suitable openings in the mounting strap 4, and are threadedly engaged in openings 8 provided in the casing 2.

The mounting strap 4 is provided with a centrally located, longitudinally extending slot 10 for receiving an operating handle 12, preferably of insulating material, such, for example, as the same type of material used for the casing 2. The mounting strap 4 is provided with extensions 14 at each end thereof which may be provided with suitable openings 15 for mounting the switch on a support. The upper end of the casing 2 is also open, except for a centrally located end barrier 16 which is formed as an integral part of the casing. The end barrier 16 is of less width than the casing so that end openings are provided at each side of the barrier 16.

Within the casing 2, there is provided one contact strip 18, of a good electrical conducting material, such for example as brass. The contact strip 18 is located along one side wall of the casing 2 in engagement therewith, and a second contact strip 20 extends longitudinally of the casing 2 along the opposite side wall thereof. The inner ends of the contact strips 18 and 20 are adapted to be supported by integral ledges 22 formed within the casing, and the contact strips extend from these ledges longitudinally of the casing and through the openings in the opposite end of the switch casing 2 at opposite sides of the barrier 16. Each of the contact strips 18 and 20 is provided with a struck-out rounded pivot projecting portion 24 at substantially the mid-point of the casing, which are adapted to be received, respectively, in rounded pivot recesses 26 provided at opposite sides of a switch button 28. The switch button 28 may be of a well-known construction, for example, a mercury switch button, and it includes opposite metallic cup-shaped members 30 having their open faces joined by a partition of insulating material 32, such for example as a ceramic insulating material. The interior of the button 28 should be partly filled with a conducting liquid, such as mercury, and the partition 32 has an opening 33 therein, so that at one rotative position of the button 28 the liquid at opposite sides of the partition 32 in contact with the metal cups 30, respectively, may be in communication so as to complete an electric circuit between the metal cups 30. Obviously, at another rotative position of the button 28, the opening through partition 32 may be disposed above the level of the conducting liquid, so as to interrupt the electric circuit between the metal cups 30.

The bottom wall of casing 2 is provided with laterally spaced integral projections 34, having curved outer ends to conform to the curvature of metal cups 30, respectively, to assist in rotatively supporting the button 28. The switch handle 12, previously referred to, has an enlarged base 36 which has a centrally located longitudinally extending slot for receiving the projecting part of the insulating partition 32 of the button 28. The base 36 of the handle 12 is also provided with integral flanges 37 at opposite sides thereof to engage the metal cups 30 of the button 28, with at least one of such flanges 37 having a key projection 38 thereon adapted to be received in a recess 40 provided on the corresponding metal cup 30 of the button 28, for the purpose of locating the handle for rotation with the button 28. A spring 42 may also be provided for maintaining the handle at an inner position within the switch casing 2, and to provide indexing. The spring 42 is a leaf type of spring having one end received in a notch 43 at the inner end of the base 36 of the handle 12, with the spring 42 extending from the notch 43 into engagement with the corresponding flange 37 of the handle and having a curved end portion 44 positioned to engage the inner surface of the mounting strap 4. At the extreme positions of the switch handle 12, the curved end portion 44 of the spring 42 is adapted to engage integral stop members 46 and 48, which may be struck inwardly from the mounting strap 4, to define the limiting positions of the switch handle 12. In addition, in moving from one stop 46 to the other stop 48, it will be apparent that the curved end portion 44 of the spring 42 will be flexed due to its engagement with the inner surface of the mounting strap 4, to provide an indexing action. The particular construction and functioning of the spring 42 and its cooperation with the structure illustrated, does not form a part of this invention, but instead is more particularly described and claimed in the co-pending application of Clarance M. Smith, on Electric Wiring Device, filed concurrently with this application, and assigned to the same assignee as this invention.

Each of the contact strips 18 and 20 is provided exteriorly of the casing 2 with a terminal portion 50 which extends laterally of its strip, and is located at an acute angle relative to the front surface of the switch. In the illustrative embodiment of the invention, the angle of the terminal portions 50 relative to the front surface of the switch is shown to be about 45°. Each terminal portion 50 is provided with an opening for receiving a terminal screw 52 which is threadedly engaged with a nut 54 located beneath each terminal portion 50. Each nut 54 is curved in section, and secured to its screw, for example, as by staking the inner end thereof. It will be observed that the terminal portions 50 of the contact strips 18 and 20 are deflected laterally in opposite directions away from each other, and away from the end barrier 16 of the switch. The front edge of each contact portion 50 is bent inwardly at 56, and the inner edge of each terminal portion 50 is adapted to be received in a groove provided in extension 60 of the bottom portion of the casing. The casing extension 60 has openings at opposite sides of barrier 16 which are adapted to be covered by the terminal portions 50, respectively, as they are located in the same plane as the terminal portions, with the one side 62 of each opening formed to support the inner edge of its terminal portion 50. Beneath each terminal portion 50, the casing extension 60 is provided with a conductor receiving opening 64, which is located in a plane at right angles to the plane of its terminal portion 50. The outer end of the contact strips 18 and 20 are secured in position by a retaining plate 58 located between the bent front edges 56 of the terminal portions and the mounting strap 4, so that when the latter is secured in position, the retaining plate 58 will act to retain the terminal portions 50 at their operative positions shown. The inner edge of the retaining plate 58 has a central extension 57 located in a recess provided in the casing 2, and opposite side edges of the retaining plate 58 are adapted to be located in slots 59 provided between the barrier 16 and the adjacent ends of the casing side walls.

It will be apparent from the description given thus far, that the switch button 28 is rotatively mounted at opposite sides of the contact strips 18 and 20, respectively, and is also supported by the casing projections 34, so that it can be moved by the operating handle 12 between two extreme rotative positions at which the circuit is opened and closed, respectively, between the metal cups 30 of the button 28. It will also be observed that the terminal portions 50 are provided at an exposed location at one end of the switch, and at an acute angle to the front face of the switch so that they may be conveniently wired by either inserting a conductor under the heads of the screws 52, where wiring from the front is desired, or a conductor may be inserted through the openings 64 to be clamped by nuts 54, where back wiring of the switch is preferred. This type of terminal construction not only has the advantage of versatility in wiring in the manner indicated, but is more accessible than conventional terminal construction, thus rendering wiring of the device much easier. Thus the wire need not be bent at sharp angles in order to be connected to the terminal 50, to thus facilitate wiring and lessen the danger of damage to the insulation of the wires. Also, in tightening the terminal screws 52, a screw driver will obviously be held at an angle perpendicular to the surface of the terminals 50, which will clearly provide for more clearance of the screw driver shank from the remaining parts of the switch than is achieved by conventional top wiring switches. This arrangement also permits tightening or otherwise adjusting the terminal screws without removing the switch from the conventional receptacle box (not shown).

Figure 4:
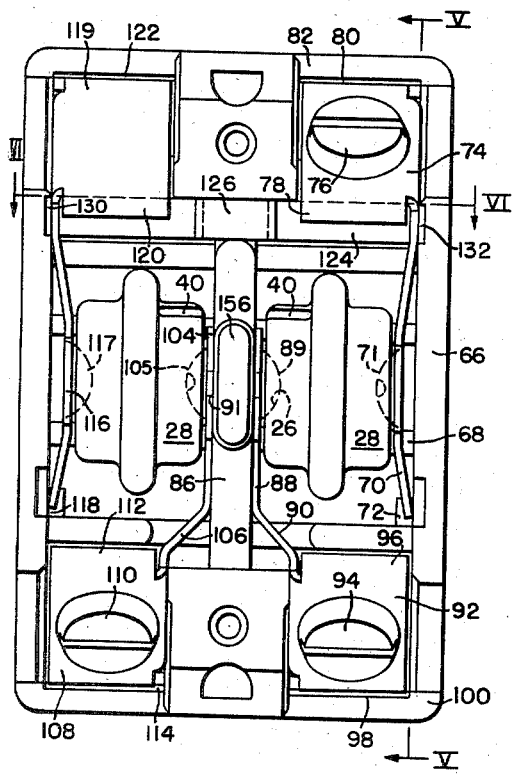
Fig. 4 is a top plan view of another type of switch embodying this invention with the cover and operating handle removed.
Figure 5:
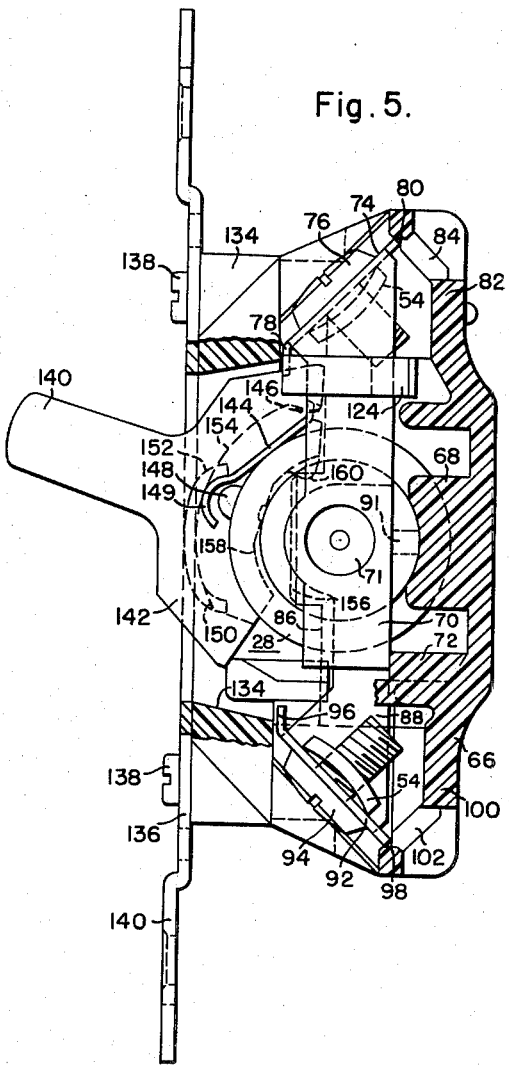
Fig. 5 is a longitudinal sectional view of the switch shown in Fig. 4 with the cover assembled therewith, and taken substantially on the line V—V thereof.
Figure 6:
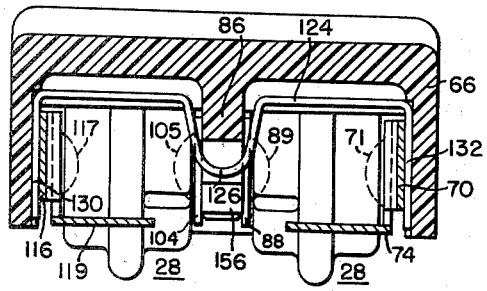
Fig. 6 is a transverse sectional view of the switch as shown in Fig. 4, and taken substantially on the line VI—VI thereof.

Referring to the embodiment of the invention shown in Figs. 4, 5 and 6, there is illustrated a three-way switch employing a pair of switch buttons 28. This form of the invention also differs from that previously described in a general way, in that a two-part casing is employed, including a base portion 66 of insulating material, such as a molded insulating material, which has a central hollow portion having an open front, in which are provided a number of integral projections 68, having concave outer ends, similar to the projections 34 of the switch shown in Figs. 1 to 3, and located so as to support two contact buttons 28 in side-by-side spaced relation. One contact strip 70 is located along one inner side wall of the base 66, being supported at its inner end on an integral ledge 72 of the casing, and being bent inwardly at an intermediate portion which has an integral rounded pivot projection 71 at the inner side thereof, with its outer end extending out through an end opening in the casing base 66 where it terminates in a laterally extending terminal portion 74, which like the terminal portions previously described, is at an acute angle to the front face of the switch, such as for example, an angle of 45°. This terminal portion 74 is provided with a terminal screw 76, adapted to engage a nut 54 at the inner side of the terminal. The front edge of the terminal 74 extends at an angle as at 78, and the rear edge is adapted to engage a shoulder 80 provided at the inner side of an opening in an integral extension 82 of the base 4. The opening in the casing extension 82 is adapted to receive the terminal portion 74, and it is also preferably provided with a conductor receiving opening 84 located behind the terminal portion 74 and at an angle of about 90° relative to the plane of the terminal 74.

The interior of the switch base 66 is provided with an integral partition 86 separating the two switch buttons 28, and a terminal strip 88 extends along the side of the partition 86 which is opposed to the terminal strip 70. The terminal strip 88 has at its inner end a pivot projection 89 located in opposition to the pivot projection 71 so that the projections 71 and 89 will be received in the pivot recesses 26 of the switch button 28 located therebetween. The contact strip 88 extends outwardly as at 90 in the opposite direction from contact strip 70 to be exposed at the opposite end of the switch where it terminates in a laterally extending terminal portion 92, also located at an acute angle to the front of the switch, similar to the terminal portion 74. The inner end of the terminal strip 88 is supported by an integral casing abutment 91, and the outer end is supported by a shoulder 98 provided in a base extension 100. The terminal portion 92 is provided with a terminal screw 94, which may engage a nut 54. The front edge 96 of the terminal portion 92 extends at an angle inwardly of the base 4, and the terminal portion 92 is located in an opening in the base extension 100, and in turn, has a conductor receiving opening 102 located behind the terminal portion 92 and in a plane substantially at right angles to the plane of the terminal portion 92.

At the opposite side of casing partition 86, there is provided a contact strip 104, having an inner pivot projection 105, and it extends in the same direction as contact strip 88 along the partition 86 where its outer end is bent at an angle as at 106, away from the partition 86 to extend through an opening in the casing where it is provided externally with a laterally extending terminal portion 108 which extends away from the terminal 92 and is in a plane at an acute angle relative to the front face of the switch similar to the terminal portion 92, and has a terminal screw 110, also like the terminal 92. The front edge of the terminal 108 is also bent inwardly at an angle at 112, and the rear edge is supported on a shoulder 114 on the base extension 100 at one side of a second opening in the base extension 100 which is covered by the terminal 108.

A fourth contact strip 116 is located to extend along the side wall of the base 66 opposed to the contact strip 104, being similar in construction to the contact strip 70. The inner end of the contact strip 116 is supported on an integral ledge 118 in the base, and the intermediate part of the contact strip is bent inwardly and is provided with an integral pivot projection 117 in opposition to the pivot projection 105 of the contact strip 104, to pivotally receive a switch button 28 therebetween. The outer end of the contact strip 116 extends through an opening in the case where it has a lateral supporting extension 119 also located at an acute angle relative to the front face of the switch. The terminal portion 74 and the supporting portion 119 extend laterally towards each other, and differ only in that the supporting portion 119 is left blank, with no provision being made for securing a conductor thereto. The supporting portion 119 of the contact strip 116 is adapted to have its rear edge supported by a shoulder 122 provided at one side of an opening in base extension 82 which is covered between supporting portion 119. The front edge of the supporting portion 119 is bent inwardly at an angle as at 120, similar to the other terminals, for a purpose to be described.

The terminal portion 74 and supporting portion 119 of the contact strips 70 and 116, respectively, are adapted to be electrically connected by a shunt strap 124 which has an intermediate bent point 126 adapted to receive the adjacent end of the central partition 86 of the base, and having at the outer ends thereof laterally extending arms 130 and 132, respectively, adapted to be received between the side walls of the base and the contact strips 116 and 70, respectively, to electrically connect these two contact strips.

The switch casing may be completed by attaching a cover 134 to the base, with the cover also being formed of an insulating material, preferably a molded insulating material. The cover 134 is provided with a central opening for a switch handle 140, and may be secured to the base 66 together with a mounting strap 136, by screws 138 which extend through the mounting strap 136 and the cover 134 to be threadedly engaged in suitable openings provided in the base 66.

The operating handle 140 is provided with an enlarged inner end 142 which is adapted to be substantially centrally located relative to the two switch buttons 28. A leaf spring 144, similar to the spring 42 previously described, may also be provided for the handle 140 and having one end located in a notch 146 in the enlarged portion 142 of the handle, and with the other end being curved as at 149, and overlying a projection 148 which is integral with the inner part of the handle 140. The mounting strap 136 may also have integral stop portions 150 and 152 for cooperation with the curved end 149 of the spring, in the same manner previously described in connection with the switch shown in Figs. 1 to 3, and further described and claimed in the aforementioned copending application. Preferably the handle 140 has its enlarged portion provided with a central curved recess 154 which is adapted to receive the central projection 156 on the base partition 86. Also, the enlarged portion 142 of the handle is provided with opposite flanges 158, which are adapted to seat on the inner metal cups of the two switch buttons 28, respectively, and each flange has a key projection 160 thereon adapted to be received in a recess 40 provided in the switch buttons 28.

It is believed to be apparent that the type of switch illustrated in Figs. 4 to 6 includes a single operating handle for a pair of switch buttons 28, and are provided with contact strips and terminal portions similar to those on the switch shown in Figs. 1 to 3. Accordingly, this switch is illustrative of the construction of a three-way type of switch, having the same advantages as those outlined in connection with the switch disclosed in Figs. 1 to 3 of the drawings.

Having described preferred embodiments of this invention in accordance with the patent statutes, it should be understood that the particular structures specifically described herein are only illustrative of the invention, and that it will be obvious to persons skilled in the art that many changes and modifications will be made in these particular devices, without departing from the broad spirit and scope of the invention. Accordingly, it is desired that the invention be broadly interpreted in accordance with the spirit of the following claims.

I claim as my invention:

1. A switch comprising, a casing of insulating material having circuit opening and closing means mounted therein operable by a switch handle movably mounted on said casing and projecting from a front surface of said switch, electrical conducting strips mounted in said casing and spaced laterally thereof for conducting current to said circuit opening and closing means, each of said strips having one end extending through a side wall of the casing and having an integral terminal portion adjacent the outer surface of the casing which extends laterally of the strip and at an acute angle to said front surface of the switch, said casing having a hollow part at the rear of each terminal portion, said hollow part having an open side next to the adjacent terminal portion extending at a corresponding angle, a terminal screw engaging an opening in each of said terminal portions and extending through said open side, a clamping nut in each casing hollow part on said screws, respectively, and a wire entrance channel in each of said casing hollow parts extending substantially parallel to the associated one of said terminal portions and to said open side.

2. An electrical wiring device comprising, a casing of insulating material having electrical contact elements therein, electrical conducting strips mounted in said casing and spaced laterally thereof for conducting current to said contact elements, each of said strips having one end extending through a side wall of the casing and having an integral terminal portion outside of the casing which extends laterally of the strip and at an acute angle away from said front surface of the switch, a terminal screw engaging an opening in each of said terminal portions, said casing having a hollow extension located behind each of said terminal portions for supporting the rear edge of each of said terminal portions, each of said casing extensions having an open side, an outwardly facing shoulder located adjacent at least a portion of the periphery of said open side whereby each of said strips may be mounted in said housing by passing them laterally through the open side until the terminal portions engage said shoulders, respectively, said casing extensions each being covered by its terminal portion, and a wire entrance channel in each of said casing extensions extending substantially parallel to the associated one of said terminal portions and to its open side.

3. A switch comprising an open sided casing of insulating material having circuit opening and closing means mounted therein operable by a switch handle movably mounted on said casing and projecting from the open side of said switch, said casing having a side wall having a portion extending at an acute angle away from said open side of said switch, an outwardly facing shoulder located on said side wall portion extending at the same angle as said side wall portion, said side wall portion having an opening therethrough which extends to said open side of said casing, at least one electrical conducting strip mounted in said casing pivotally engaging said circuit opening and closing means at a point spaced from said side wall portion, said strip having one end extending through said side wall and having an integral terminal portion which extends laterally of the strip and at an acute angle away from the open side of said switch and engaging said shoulder, whereby said circuit opening and closing means and said electrical conducting strip can be assembled in said housing by passing the former through the open side of said housing and pivotally moving said electrical conducting strip about said pivot point until said terminal portion engages said shoulder, a wire entrance channel in said side wall portion extending substantially parallel to said terminal portion, and means for securing a lead wire to said terminal portion.

4. A switch comprising a casing of insulating material having circuit opening and closing means mounted therein operable by a switch handle movably mounted on said casing and projecting from a front surface of said switch, electrical conducting strips mounted in said casing and spaced laterally thereof for conducting current to said circuit opening and closing means, said casing having a pair of end walls disposed substantially perpendicular to said front surface and each adjoining a back wall extending substantially parallel to said front surface, each of said strips having an integral terminal portion extending adjacently and at an acute angle to said one end wall, said casing having a hollow part disposed at the rear of each terminal portion, said hollow part having an open side next to the adjacent terminal portion disposed substantially parallel thereto, a terminal screw engaging an opening in each of said terminal portions and extending through said open side, a clamping nut in each of said hollow parts on said screws, and a wire entrance channel in each of said casing hollow parts extending substantially parallel to said terminal portions and to said open side, said entrance channel extending through adjacent portions of said back wall and of the associated one of said end walls, respectively.

References Cited in the file of this patent

UNITED STATES PATENTS

| | | |
|---|---|---|
| 2,434,065 | Courtney | Jan. 6, 1948 |
| 2,532,305 | Heller | Dec. 5, 1950 |
| 2,670,421 | Coutant | Feb. 23, 1954 |
| 2,734,958 | Immel et al. | Feb. 14, 1956 |
| 2,749,413 | Bordner | June 5, 1956 |
| 2,759,063 | Rypinoki | Aug. 14, 1956 |
| 2,784,279 | Coutant | Mar. 5, 1957 |